Jan. 1, 1924. 1,479,500
J. GEISSLINGER
INSTALLATION FOR REGULATING AN ELECTRIC CURRENT NETWORK SUPPLIED WITH
CURRENT FROM A GENERATOR RUNNING AT VARIABLE SPEED
Filed Oct. 4, 1922 2 Sheets-Sheet 1

Inventor
Jean Geisslinger

Pennie, Davis, Marvin & Edmonds
Attorney

Jan. 1, 1924. 1,479,500
J. GEISSLINGER
INSTALLATION FOR REGULATING AN ELECTRIC CURRENT NETWORK SUPPLIED WITH
CURRENT FROM A GENERATOR RUNNING AT VARIABLE SPEED
Filed Oct. 4, 1922 2 Sheets-Sheet 2
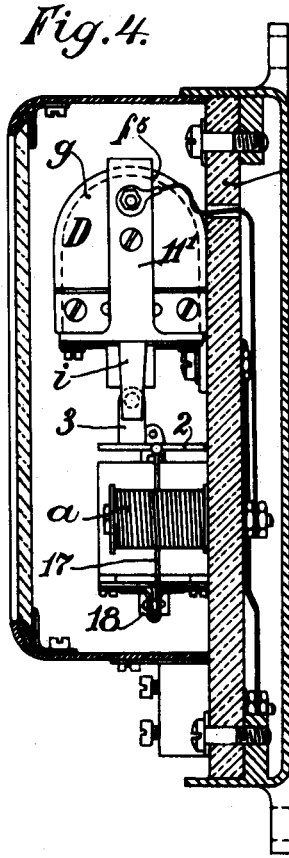
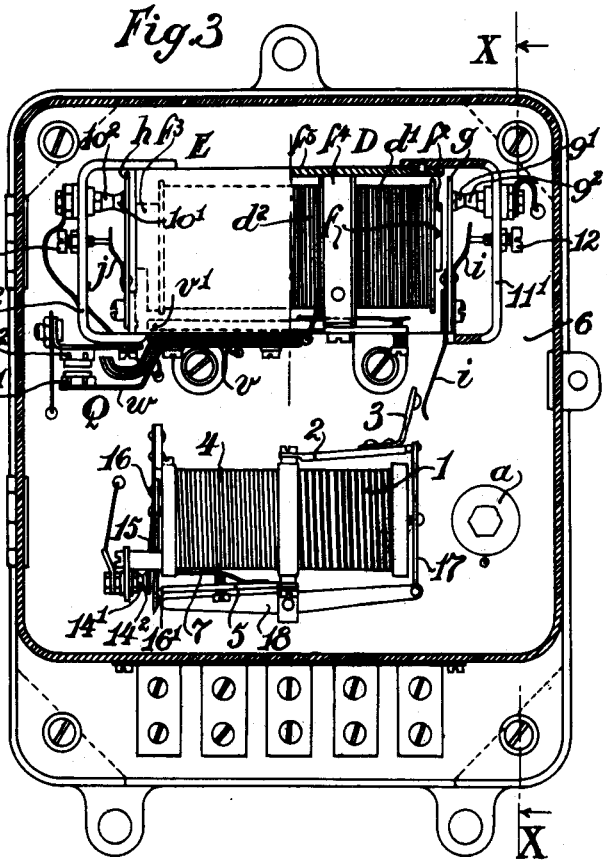

Patented Jan. 1, 1924.

1,479,500

UNITED STATES PATENT OFFICE.

JEAN GEISSLINGER, OF CAROUGE, NEAR GENEVA, SWITZERLAND, ASSIGNOR TO JAMES THUM, OF GENEVA, SWITZERLAND.

INSTALLATION FOR REGULATING AN ELECTRIC-CURRENT NETWORK SUPPLIED WITH CURRENT FROM A GENERATOR RUNNING AT VARIABLE SPEED.

Application filed October 4, 1922. Serial No. 592,193.

*To all whom it may concern:*

Be it known that I, JEAN GEISSLINGER, a citizen of the German Republic, residing at Carouge, near Geneva, Canton of Geneva, Confederation of Switzerland, have invented certain new and useful improvements in installations for regulating an electric-current network supplied with current from a generator running at variable speed, of which the following is a specification.

The object of the invention is an installation for regulating an electric system supplied with current derived from a generator running at variable speed.

The new installation is essentially characterized by the fact that it comprises in combination two automatic adjustable regulators, one of which depends on the tension of said generator, and the other on the intensity of the current supplied by said generator, the two regulators being adapted to connect or to cut out a resistance which is common to both of them and serves to vary the current passing into the excitation circuit of said generator.

The attached drawing shows by way of example two working forms of the installation.

Fig. 3 is a front view of the second working form, the cover being in section.

Fig. 4 is a vertical section of Fig. 3 on the lines X—X.

Fig. 5 shows the diagram of the electric connections of the second working form.

Figure 1:
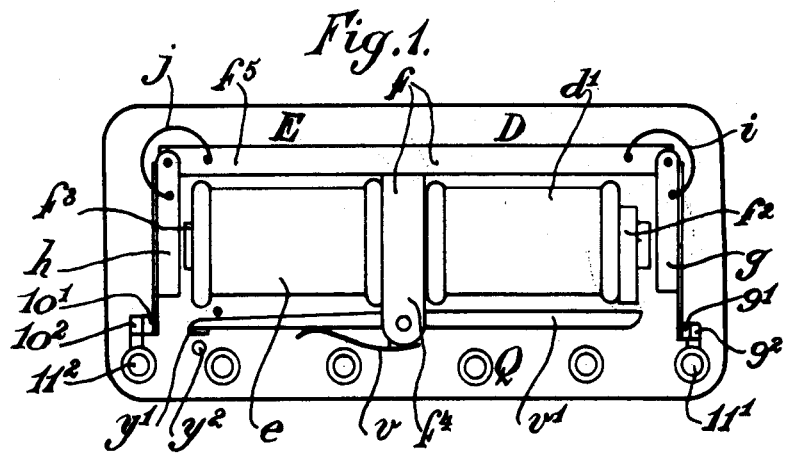
Fig. 1 is a partial diagrammatic front view of the first working form.
Figure 2:
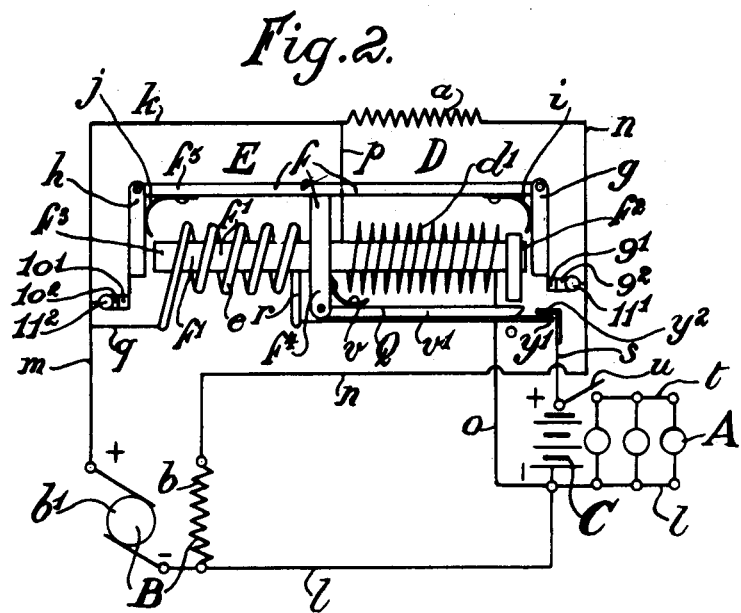
Fig. 2 shows a diagram of the electric connections of said first working form.

The two working forms are adapted to regulate an electric lighting system of a railway carriage provided with the lamps A (Fig. 2 and 5) and fed by a direct current shunt generator B driven by one of the axles of the vehicle and also by a storage battery C not provided with a cell switch. The construction further comprises two automatic vibro-regulators D, E (see also Fig. 1, 2 and 4), both adapted to regulate the current passing into the shunt exciting winding $b$ of the generator B. The regulator D is operated by the tension of the current of the generator B whilst the regulator E is operated by the intensity of the current produced by the said generator. For this purpose the said two regulators D, E short-circuit a common resistance $a$ for a longer or shorter period per unit of time, the said resistance $a$ being common to both regulators and arranged in series with the winding $b$ in the exciting circuit.

In the first working form (Figs. 1 and 2) one of the ends of the resistance $a$ is connected by a conductor $n$ to one of the ends of the winding $b$ the other end of which is in permanent communication with a conductor $l$ permanently connecting the negative pole of the armature $b^1$ to one of the poles of the battery C and to one of the terminals of the various lamps A; the other end of the said resistance $a$ is connected by conductors $k$ and $m$ to the positive pole of the armature $b^1$.

The two regulators D, E have a common field frame $f$ comprising a straight core $f^1$ of circular cross-section and two pole-pieces $f^2, f^3$, a centre piece $f^4$ arranged transversely on the core $f^1$ and finally a straight member $f^5$ arranged parallel to said core $f^1$. On the right hand of the centre piece $f^4$ a coil $d^1$ of thin wire is provided for belonging to regulator D and connected on the one side by means of conductors $o$ and $l$ to the negative pole of the armature $b^1$, and on the other side by means of conductors $p$, $k$ and $m$ to the positive pole of said armature $b^1$. On the left hand of the centre piece $f^4$ the core $f^1$ is provided with a thick-wire coil $e$ belonging to the regulator E and is connected through conductors $q$, $m$ to the positive pole of armature $b^1$, and by means of conductors $r$, $s$ to the positive pole of storage battery C. This latter pole is connected by means of conductor $t$, in which an interrupter $u$ is inserted with the second terminals of the various lamps A. The two pole pieces $f^2, f^3$ are adapted to attract the blade-members $g$, $h$ of magnetic material. They are linked onto the straight member $f^5$ and are submitted to the action of the springs $i$, $j$. The blade-members $g$, $h$ are provided with insulated contacts $9^1$, $10^1$ which under the influence of the springs $i$, $j$ tend to press against the contacts $9^2$, $10^2$ fixed onto the terminals $11^1$, $11^2$ which are connected to the conductors $n$ and $k$ respectively. When the two contacts $9^1$, $10^1$ are in touch with the contacts $9^2$, $10^2$ the resistance $a$ is short-circuited through $g$, $f^5$, $h$ and the current in the winding $b$ attains its maximum. By means not shown in the drawing the pull of the two springs $i$, $j$ and consequently the value of the attraction exercised by the pole pieces $f^2$, $f^3$ and which is to become active on the blade-members $g$, $h$ in order to overcome the resistance of said springs $i$, $j$ may be adjusted at will.

Assuming for the sake of argument the contacts 10 to remain permanently closed, the regulator D will behave as follows:

The resistance $a$ of the winding $b$ is designed so that the tension of the current of the generator B is exactly of the desired value when the railway carriage travels at given average speed limit. At this speed and this tension the attraction exerted by the pole-piece $f^2$ on the blade member $g$ is not sufficient to overcome the pull of the spring $i$ keeping the contacts 9 closed and short-circuiting the resistance $a$, the amount of which is therefore not added to the resistance of the winding $b$ to reduce the current passing into the latter.

If the speed of the vehicle exceeds the given average speed limit the tension of the generator B and the attraction exercised by the pole piece $f^2$ on the blade-member $g$ increase, so that the blade-member $g$ is moved in spite of the pull of the spring $i$ and the contacts $9^1$, $9^2$ are separated whereby the resistance $a$ is connected in series with the winding $b$ with the result that the tension on the terminals of the generator B is decreased and the attractive power of the pole piece $f^2$ being consequently reduced, the pull of the spring $i$ makes the contacts $9^1$, $9^2$ to touch each other again so that the resistance $a$ is once more short-circuited.

The cycle of operations is repeated at very short intervals. The resistance $a$ is in series with the winding $b$ during a part of the time and the average tension at the terminals of generator B in fact becomes the one desired, provided the resistance $a$ has been calculated to provide a suitable field in the winding $b$ when the current passes, as above described.

If the speed of the vehicle and that of the generator B is decreased below a value between that of the last speed considered and of the given average limit, the tension at the terminals of generator B is lowered and the current in the winding $d^1$ diminishes, and the spring $i$ will overcome the attractive power of the pole piece $f^2$ and by bringing the contacts $9^1$ and $9^2$ into touch with one another the resistance $a$ will be cut out.

Since the tension of the generator B is lower than before, a longer period of time is required for the said tension to rise to a value which is sufficient for the core $f$ to overcome the pull of the spring $i$. If it has come to this the contacts 9 are separated, the resistance is switched in again and the tension at the terminals of the generator B drops off again fairly rapidly. The cycle of operations is immediately repeated. In this case the periods of time during which the resistance $a$ is short-circuited are longer than in the previous case, so that the tension of the said generator B again attains its predetermined average value. Thus within certain limits of speed the vibro-regulator D keeps the tension at the terminals of the generator B at the predetermined average value by short-circuiting the resistance $a$ for increasingly longer periods of time in proportion to the falling off of the speed.

The working of the vibro-regulator E is identical to that of the vibro-regulator D with the exception, however, that the said regulator E is not operated by the variations in the tension at the terminals of the generator B but by the variations of the intensity of curent generated by the latter. The resistance $a$ is connected in series with the winding $b$ for increasingly longer periods of time in proportion to the increase of intensity.

The tension of the springs $i$, $j$ may be separately adjusted by means not shown in the drawing and thereby the periods of time during which the resistance $a$ is connected in series with the winding $b$ for a given speed of the vehicle or for a given intensity of the current of the generator B may be varied at will.

The storage battery C must be connected on the one hand to the generator B at the moment when after starting and increasing in speed, the tension of the generator B has been sufficiently raised to allow the charging of the battery C to take place without causing the lamps to flicker. The said battery must on the other hand be disconnected at the moment when the current in the generator B has a tendency to become reversed. This double effect is obtained by means of a switching device Q comprising a blade-member $v^1$ of magnetic material and linked to the centre piece $f^4$ submitted to the action of the spring $v$ and adapted to be attracted by the pole-piece $f^2$ provided for that purpose with an extension towards the bottom of Figs. 1 and 2. The blade-member $v^1$ is made in one piece with a contact $y^1$ insulated from the former and connected to the conductor $r$ coming from the winding $e$. The contact $y^1$ is separated from a contact $y^2$ connected to conductor $s$ by means of the spring $v$.

In the position of rest the spring $v$ separates the two contacts $y^1$, $y^2$ from one another so that the positive pole of the generator B is not connected to the positive pole of the storage battery C. When the vehicle and the generator B are started, the tension of the latter is initially too low for the coil $d^1$, which is traversed by a weak current, to excite the core $f$ sufficiently to cause the pole-piece $f^2$ to attract the blade-member $v^1$, so that the circuit of B remains open at $y$. A state will however be reached, in the course of the starting, in which the speed of the vehicle and the tension of the generator B are sufficiently high to cause the coil $d^1$ to attract the blade-member $v^1$ for closing the circuit of the generator B at $y$, so that current is now supplied to the battery C and to the lamps A.

When the speed of the vehicle and the tension of the generator are again lowered to their predetermined minimum limit, the current in the winding $e$ is reversed and acts in the opposite direction as does the coil $d^1$, so that the blade-member $v^1$ is no longer attracted by the pole-piece $f^2$ and the circuit of the generator B is opened at $y$ by the spring $v$.

In the second working form (Figs. 3 to 5) one of the ends of the resistance $a$ is connected by means of the conductors $n$, $n^1$, $n^2$ to one of the ends of the winding $b$ whose other end is permanently connected to a conductor $l$ by which the negative pole of the armature $b^1$ is permanently in connection with the corresponding pole of the storage battery C and with one of the terminals of the various lamps A. The other end of the said resistance $a$ is connected by means of the conductors $k$, $k^1$ and $m$ to the positive pole of the armature $b^1$.

The two regulators D, E comprise as in the first working form the common field frame $f$ with a straight core $f^1$ of circular cross-section, with two pole pieces $f^2$, $f^3$ with a centre piece $f^4$ and finally with a sheath $f^5$ having a cross-section of the form of an inverted U and being arranged parallel to the core $f^1$. The field frame is fixed on top of a foundation plate 6 of insulating material. On both sides of the centre piece $f^4$ are arranged the fine-wire coils $d^1$, $d^2$ belonging to the regulator D and connected in series one with the other. They are connected on the one hand by means of the conductors $o$ and $l$ to the negative pole of the armature $b^1$ and on the other hand by means of the conductors $p$, $q$, $m$ to the positive pole of said armature $b^1$. The positive pole of the storage battery C is connected by means of the conductors $t^1$, $t$ into which an interrupter $u$ is inserted, with the second terminals of the various lamps A. The pole pieces $f^2$, $f^3$ are adapted to attract the blade-members $g$, $h$ of magnetic material and carried by the springs $i$, $j$ and provided with contacts $9^1$ $10^1$ which under the influence of the springs $i$ $j$ tend to keep in touch with the contacts $9^2$ $10^2$ which are carried by the hoops $11^1$, $11^2$ and which are respectively connected with the conductors $k$, $n$. The hoops $11^1$, $11^2$ are fixed to the sheath $f^5$ which connects them electrically one with the other, just as it connects the two blade-members $g$, $h$ electrically. The hoops $11^1$, $11^2$ carry the screws 12, 13 the points of which bear against the springs $i$, $j$ and which serve to regulate the pull of the same and consequently the value of the attraction which must be exercised by the two pole-pieces $f^2$, $f^3$ in order to overcome the resistance of said springs.

The tension of the springs $i$, $j$ may be separately adjusted by means not represented in the drawing and thereby the periods of time during which the resistance $a$ is connected in series with the winding $b$ for a given speed of the vehicle or for a given intensity of the generator current B may be varied at will.

The switching device Q comprises the spring $v$ fastened by one of its ends to the centre piece $f^4$ and carries the blade member $v^1$ adapted to become attracted not by the pole piece $f^2$ but by the pole piece $f^3$ which for this purpose extends towards the bottom as shown in Figs. 3 and 5. The spring $v$ is rigidly connected with a blade $w$ from which it is however insulated, said blade $w$ being connected with the conductor $r$ to which is fixed the contact $y^1$.

The generator B is designed so as to fully charge the elements of the storage battery C, for instance at 2, 5 volts whilst the lamps A are provided for a tension of 2, 2 volts per element of the battery X and may be damaged if the tension rises to 2, 5 volts. The full charging of the battery should therefore only take place when the lamps A are not in use. To this end the spring $i$ of the blade member $g$ is adjusted in such a manner that the pull is modified and that the excitation of the generator is limited to its lower value whilst the lamps A are in the circuit. For this purpose the winding $1^1$ of a straight electromagnet 1 is switched between the conductors $t$, $t^1$, that is to say between the storage battery C and the lamps A so that a current flows through it as soon as one of the lamps A is burning. The core $1^2$ of the electromagnet 1 then attracts a blade-member 2 provided with a nose 3 acting on the spring $i$ in the desired manner. It is to be observed that in order to simplify the diagram the connection between the blade-members $g$ $h$ and in consequence the position of their linking point are shown in the Fig. 5 to be on top of the field frame $f$ whilst in fact they are disposed at the bottom as shown in Fig. 3. As a result in Fig. 5 the nose 3 acts on the spring $i$ in an opposite direction from that shown in Fig. 3.

On the other hand it will be of advantage to stop the charging of the storage battery C as soon as it is fully charged. For this purpose a second electromagnet 4 is provided having a winding $4^1$ arranged on the core which is common to both electromagnets 1, 4 and which winding is adapted to attract an armature 5 held in position of rest by a spring 7. The winding $4^1$ is connected by a conductor 8 to the conductor $q$ and on the other end to the conductor $o$, so that it is submitted to the difference of tension existing between the two poles of the generator B. In its position of rest the armature 5 secures the contact between the contact pieces $14^1$ and $14^2$ which are respectively connected with the conductors $n^1$, $n^2$ and thereby close the circuit of the excitation winding. If the armature 5 is attracted by the electromagnet 4 the said two contacts may be separated by the action of spring 15 and the generator B which is no longer is excited, cannot charge the battery any longer. When the armature 5 has been brought into the position in which the contact $14^1$ is separated from the contact $14^2$ it is maintained in that position by a nose $16^1$ of a blade 16 which is integral with the spring 15. It is therefore necessary as soon as the current is again tapped from the storage battery C and a new charging is required, to return the nose $16^1$ in its previous position and that the armature 5 maintains the contacts $14^1$ and $14^2$ in touch with one another. The blade-member 2 of the electromagnet 1 which is excited as soon as a lamp is burning, is connected by a small rod 17 to one of the ends of a lever 18 whose other rounded-off end moves the nose $16^1$ from the right to the left as soon as 1 becomes excited, so that the armature 5 is free to take its previous position under the influence of the spring 7 and that the excitation of the generator B may recommence.

As shown by experience the described working forms secure a perfect automatic regulating of the system without the necessity of providing the generator B with auxiliary brushes, or with a compound winding, or with a transverse winding or the like, even if the speed which is going to be utilized varies between limits which are very far apart one from the other.

The installation may be used for regulating other systems than a lighting system of a railway carriage, for instance the system of an automobile. The use of a storage battery may also be dispensed with.

I claim:

1. In an installation for regulating the electric system supplied with current derived from a generator running at variable speed in combination two automatic and adjustable regulators of which one is being operated by the influence of the tension of said generator, and the other by the influence of the intensity of the current supplied by said generator, the said regulators being adapted to regulate the tension of the generator by connecting and disconnecting a resistance which is common to both regulators and which is designed to vary the current flowing in the excitation circuit of said generator.

2. In an installation for regulating the electric system supplied with current from a generator running at variable speed in combination two automatic and adjustable vibrating-regulators of which one is being operated by the influence of the intensity of the current supplied by said generator, the said regulators being adapted to regulate the tension of the generator by connecting and disconnecting a resistance which is common to both regulators and which is designed to vary the current flowing in the excitation circuit of said generator.

3. In an installation for regulating the electric system supplied with current derived from a generator running at variable speed in combination two automatic and adjustable regulators of which one is being operated by the influence of the tension of said generator, and the other by the influence of the intensity of the current supplied by said generator, the said regulators being adapted to regulate the tension of the generator by connecting and disconnecting a resistance which is common to both regulators and which is designed to vary the current flowing in the excitation circuit of said generator. two windings, each one belonging to one of the two regulators and adapted to give passage the one to a current made dependent on the tension of the generator, and the other to a current supplied from said generator, said windings being arranged on a magnet core opposite to which are provided two armatures which by means of springs are kept in such a position that the said common resistance is short-circuited, but which armatures are adapted to become attracted by the magnet core and thereby to switch the said common resistance into the circuit.

4. In an installation for regulating the electric system supplied with current derived from a generator running at variable speed in combination two automatic and adjustable regulators of which one is being operated by the influence of the tension of said generator, and the other by the influence of the intensity of the current supplied by said generator, the said regulators being adapted to regulate the tension of the generator by connecting and disconnecting a resistance which is common to both regulators and which is designed to vary the current flowing in the excitation circuit of said generator, and a storage battery for supplying the network also with current, a switching device for connecting the generator to the storage battery and to separate it therefrom, a third armature capable to be operated from said magnet core and belonging to the said switching device, said magnet core being adapted to attract the third armature and thereby connect the generator to the battery as soon as the tension of the former has attained a predetermined value, the said third armature being besides arranged in such a manner as to tend to be kept by means of a spring in such a position in which the generator is separated from the battery.

5. In an installation for regulating the electric system supplied with current derived from a generator running at variable speed in combination two automatic and adjustable regulators of which one is being operated by the influence of the tension of said generator, and the other by the influence of the intensity of the current supplied by said generator, the said regulators being adapted to regulate the tension of the generator by connecting and disconnecting a resistance which is common to both regulators and which is designed to vary the current flowing in the excitation circuit of said generator, two windings, each one belonging to one of the two regulators and adapted to give passage the one to a current made dependent from the tension of the generator, and the other to a current supplied from said generator, said windings being arranged on a magnet core opposite to which are provided two armatures which by means of springs are kept in such a position that the said common resistance is short-circuited, but which armatures are adapted to become attracted by the magnet core and thereby to switch the said common resistance into the circuit, the said two windings being designed so as to act on the one part in the same way on the magnet core and to thereby cause a strong attraction of a third armature for making it to connect the generator to the battery as soon as the tension of the generator is at least equal to that of battery, and on the other part to act in the reversed way one to the other upon said magnet core as soon as the tension of the generator drops below that of the battery so that the corresponding spring is easily able to then bring the amature into such a position that the connection of the generator with the battery is interrupted.

6. In an installation for regulating the electric system supplied with current derived from a generator running at variable speed in combination two automatic and adjustable regulators of which one is being operated by the influence of the tension of said generator, and the other by the influence of the intensity of the current supplied by said generator, the said regulators being adapted to regulate the tension of the generator by connecting and disconnecting a resistance which is common to both regulators and which is designed to vary the current flowing in the excitation circuit of said generator, a device adapted to act upon that regulator which is placed under the influence of the generator tension in such a manner that on the one part the normal value of this tension is maintained as long as one of the working apparatus is connected to the current network and on the other part, that the said tension may attain a higher value which allows full charging of the battery as soon as one of the working apparatus is in service.

7. In an installation for regulating the electric system supplied with current derived from a generator running at variable speed in combination two automatic and adjustable regulators of which one is being operated by the influence of the tension of said generator, and the other by the influence of the intensity of the current supplied by said generator, the said regulators being adapted to regulate the tension of the generator by connecting and disconnecting a resistance which is common to both regulators and which is designed to vary the current flowing in the excitation circuit of said generator, and a storage battery for supplying the network also with current, a switching device for connecting the generator to the storage battery and to separate it therefrom, a third armature capable to be operated from said magnet core and belonging to the said switching device, said magnet core being adapted to attract the third armature and thereby connect the generator to the battery as soon as the tension of the former has attained a predetermined value, the said third armature being besides arranged in such a manner as to tend to be kept by means of a spring in such a position that the generator is separated from the battery, and further a device designed to interrupt the charging of the battery as soon as the latter has been fully charged.

In testimony whereof I have affixed my signature in presence of two witnesses.

JEAN GEISSLINGER.

Witnesses:
D. ROD. DE WURSTEMBERGER,
EDWARD EMMANUEL.